United States Patent [19]

Dawes

[11] Patent Number: 5,132,253
[45] Date of Patent: Jul. 21, 1992

[54] SOL-GEL METHOD FOR MAKING CERAMIC MATERIALS

[75] Inventor: Steven B. Dawes, Corning, N.Y.
[73] Assignee: Corning Incorporated, Corning, N.Y.
[21] Appl. No.: 628,413
[22] Filed: Dec. 17, 1990
[51] Int. Cl.$^5$ .......................... C03C 6/00; C04B 35/00
[52] U.S. Cl. ............................................ 501/12; 501/3; 423/118; 423/155; 423/158; 423/164
[58] Field of Search ...................... 501/3, 12; 423/118, 423/155, 158, 164

[56] References Cited

U.S. PATENT DOCUMENTS

| | | | |
|---|---|---|---|
| 3,689,293 | 9/1972 | Beall | 501/3 |
| 3,756,838 | 9/1973 | Beall | 501/3 |
| 4,726,938 | 2/1988 | Rollat et al. | 423/21.5 |

*Primary Examiner*—Theodore Morris
*Assistant Examiner*—David M. Brunsman
*Attorney, Agent, or Firm*—Kees van der Sterre

[57] ABSTRACT

A method for synthesizing alkaline earth metal-containing ceramic materials by sol-gel processing is described, wherein a sol containing alkoxides or other soluble precursors for a selected ceramic composition, and additionally containing one or more dissolved alkaline earth metal/crown either complexes, is gelled, dried and fired to convert the precursors and complexes to a polycrystalline ceramic product. The crown ether complexes improve alkaline earth metal solubility and the homogeneous incorporation of these metals into the precursor gels and final crystalline products.

8 Claims, No Drawings

SOL-GEL METHOD FOR MAKING CERAMIC MATERIALS

BACKGROUND OF THE INVENTION

The present invention relates to sol-gel methods for the manufacture of ceramics, and more specifically to methods useful for the sol-gel synthesis of ceramics comprising alkaline earth metal oxides, particularly ceramic films or coatings comprising these oxides.

While the production of oxide and other ceramic products through the sintering or reaction sintering of appropriate inorganic starting materials has long been practiced, recent advances in materials science have demanded that new methods for making ceramic components be developed. Particularly in the area of glass or ceramic films or coatings, techniques such as vapor deposition and sol-gel processing have been the subject of increased attention. These processes have the potential for producing high quality ceramic materials at reduced temperatures, and thus can be used, for example, to impart physical protection, increased surface hardness, special dielectric properties, or other advantageous properties to a variety of substrate materials.

One specific example of such a development is found in U.S. Pat. No. 4,935,387, which discloses methods for the production of mica coatings on inorganic fibers. As disclosed in that patent, synthetic fluormica coatings may be developed on fiber or other substrate materials from acidified alkoxide sols, applied to the substrates as coatings and then gelled and heat treated to to develop the desired fluormica crystal phases.

The sol-gel method described in this patent is particularly suitable for the production of potassium-containing fluorphlogopite micas. However, micas with alkaline earths, rather than potassium, as the interlayer cations are desirable for their stronger interlaminar shear properties and for their greater refractoriness. The method of the aforementioned patent is not well adapted to the synthesis of such micas.

In general, homogeneous sols and gels of the alkaline earth metals are not easily prepared from acidified alkoxide solutions of alkaline earth metals when fluoride is also present, because the addition of fluoride usually results in the precipitation of alkaline earth fluorides. Thus although some calcium phlogopite mica products have been obtained by this method, better approaches to the production of strontium and barium micas are needed. In the case of barium alkoxide solutions, particularly, barium precipitates can be formed even in the absence of fluorine from the solution. These difficulties also extend to the synthesis of other ceramic materials by sol-gel processing.

Accordingly, it is a principal object of the present invention to provide a method for the production of stable, homogeneous alkaline earth-containing sols useful for the synthesis of ceramic products from solutions.

It is a further object of the invention to provide a sol-gel method for making a ceramic product, including a ceramic film or coating, from an alkaline earth-containing sol.

It is a further object of the invention to provide a novel sol-gel method for the synthesis of alkaline earth metal-containing fluormicas which employs new solution complexes of alkaline earth metal sol components for improved sol stability.

It is a further object of the invention to provide fiber materials provided with alkaline-earth-containing ceramic coatings, and products incorporating such coated fiber materials.

Other objects and advantages of the invention will become apparent from the following description thereof.

SUMMARY OF THE INVENTION

The fundamental problem presented by the alkaline earth metals in the preparation of alkoxide sols for ceramic synthesis is that soluble compounds of these metals, most typically the alkoxides, are not stable in conventional solutions. Instead, these compounds easily react to form largely insoluble oxides, hydroxides, nitrates, or fluorides, and the precipitation of these species prevents the incorporation of the cations into the desirable "polymeric" mixed cationic alkoxy/hydroxy chains that constitute the most useful gel precursors for the formation of homogeneous ceramic products.

The present invention utilizes a complexation approach to stabilize the alkaline earth metal components selected for use in ceramic synthesis. Using this approach, a homogeneous distribution of these metal species in ceramic precursor gels or precipitates can be achieved.

The complexing agents used in accordance with the invention are the crown ethers. Crown ethers are well known macrocyclic molecules having ring sizes of at least 9 atoms, with larger rings sizes being formed in three-atom increments. The three-atom unit in these molecules is a —$CH_2$-O-$CH_2$—ether group, the oxygen atom in this group providing a strong electron donating capability.

The most commonly used crown ethers are the 5- and 6-oxygen ethers, known respectively as 15-crown-5 (1,4,7,10,13 pentaoxacyclopentadecane) and 18-crown 6-(1,4,7,10,13,16 hexaoxacyclooctadecane). In this nomenclature, from C. J. Pedersen, J. Am. Chem. Soc., 89, page 7017 (1967), the first number refers to the number of atoms in the ring and the second number to the number of ether oxygens. For a further description of these compounds and their characteristics, reference may be made to J. D. Lamb, R. M. Izatt, and J. J. Christiansen, "Progress in Macrocyclic Chemistry," R. M. Izatt, Ed., Wiley, New York (1981).

Crown ethers can form highly selective, relatively stable complexes with alkaline earth metal species such as strontium and barium, in appropriate solvents. It has now been found that clear, homogeneous alkoxide sols or solutions, substantially free of alkaline earth metal precipitates, can be formed using these ethers. Moreover, the fluidity of the resulting sols is sufficiently high that the sols will readily form thin, uniform films or coatings on flat or curved substrates such as the surfaces of reinforcing fibers. Finally, the complexed cations have been found to effectively participate in the formation of hydrolysis polymers in the sols during subsequent gelling or drying of solution films or coatings. Thus homogeneous gels and/or precipitates containing the cations are formed.

In one aspect, then, the present invention provides an improved method for synthesizing an alkaline earth metal-containing ceramic product. In accordance with that method, a stable homogeneous sol or solution comprising precursors for the ceramic material is first prepared, with the selected precursors including, in addition to conventional soluble or colloidal compounds of the desired ceramic components, at least one dissolved crown ether complex of an alkaline earth metal.

Sols or solutions comprising crown ether complexes as described are thereafter treated to extract solvents and to yield an intimate homogeneous solid mixture of the precursor compounds or their solution reaction products. In this treatment, the sol or solution is most preferably gelled, e.g., by hydrolysis, prior to and/or during solvent extraction, since gelation can develop a solid, homogeneous, polymeric gel structure wherein all of the precursor constituents are uniformly distributed.

The gel or other solidified mixture resulting from solvent extraction is thereafter typically heat treated to react the precursor constituents together to produce a homogeneous ceramic product of the selected composition. Due to the uniformity of distribution of precursors in the mixture, ceramic products of precisely engineered composition and crystal structure can be provided.

In a particularly preferred embodiment, the invention comprises a process for producing synthetic fluormica crystals, or products containing them. Many of these fluormicas are quite difficult to synthesize by other solution processes. The synthetic fluormicas of particular interest are comprising alkaline earth metal cations, and particularly those wherein the alkaline earth metal cations comprise the interlayer cations of the mica crystals.

In the general process for the synthesis of fluormica products, a silicate sol is first prepared. The silicate sol comprises at least the alkoxides of Si and Al, and additionally comprises a dissolved crown ether complex of at least one alkaline earth metal selected from the group of Ca, Sr and Ba. Other compatible alkoxides or other compounds, particularly including the magnesium alkoxides, may be present as optional constituents of the sol.

The sol thus prepared is next caused to gel, most preferably by hydrolysis of the alkoxides therein to form an alkoxide gel. This gel is characterized by a structure which intimately incorporates a homogeneous dispersion of alkaline earth metal species.

Following gelation of the sol, the solvent is extracted therefrom to produce a dry gel, and the dry gel is finally heat-treated to convert it to a predominantly crystalline ceramic product wherein synthetic fluormica containing structural alkaline earth metal cations constitutes the principal crystalline phase.

Ceramic products, and particularly synthetic fluormica products, produced by the method of the invention may be used for a wide variety of specialty applications wherein high purity in combination with low processing temperatures are required. Particularly important, for example, are products such as sheets, films or coatings formed of synthetic fluormica crystals incorporating alkaline earth metal interlayer cations, these micas offering a high degree of physical integrity in combination with improved structural stability at high temperatures.

A particularly preferred application for mica coatings provided in accordance with the invention is to protect inorganic fibers used for the reinforcement of ceramic matrix materials from harmful interactions or damage during the fabrication of fiber-reinforced composites, and during subsequent use. Thus the invention further comprises a method for making a fiber-reinforced ceramic matrix composite article wherein the fibers to be used for reinforcement are provided with a synthetic fluormica coating. The coating is provided from a silicate sol comprising at least the alkoxides of Si and Al together with a dissolved crown ether complex of at least one alkaline earth metal selected from the group of Ca, Sr and Ba. Gelation of this sol coating, followed by heat treatment to complete mica crystallization, provides a fluormica fiber coating of improved refractoriness and excellent uniformity, such that high-use-temperature ceramic composites may be obtained.

DETAILED DESCRIPTION

It is well known that organic complexing agents can be used to modify the properties of solutions containing inorganic cations. One particularly useful application of complexants is to solubilize salts in solvent systems that alone cannot be used to dissolve the ions. Water, ammonia and most other conventional polar solvents solvate cations by forming solvation complexes such as $Cr(H_2O)_6^{3+}$. However, these complexes, if formed, may not be sufficiently stable to prevent precipitation reactions from occurring.

The typical organic complexant is a molecule having one or more electron-rich atoms that are able to interact with an electron-deficient cation via electrostatic attraction. Such complexants can sometimes form stable complexes with ions not easily dissolved by conventional solvents; however, the replacement of a conventional solvation shell by another complexant does not necessarily provide predictable changes in solution characteristics. The solubility of a particular cation may increase or decrease, the ionic strength of the solution may vary, and the reactivity of the ions in solution may change.

The conformation of the crown ether ring is such that the inner core of the ring is quite polar with oxygen lone pairs directed towards the center of the ring, but the outer rim of the molecule is very non-polar with only methyl groups directed outward. This configuration allows a charged molecule to interact with the core of the crown ether, and the rim of the ether interacts with the solvent.

In their lowest energy conformations the crown ethers have hole sizes of 1.70 Å for 15-crown-5, and 2.76 Å for 18-crown-6. These are of the scale of alkaline earth cationic diameters ($Ba^{++}=2.8$ Å), and Lamb et al., supra, have shown that those molecules have high affinity for alkaline earth cations based on a match of cation radius and complexant size. And, cations with larger radii than possessed by a selected crown ether complexant may still be effectively complexed by two crown ether molecules, which may combine around the cation to form a sandwich-type structure (e.g., $Ba(15\text{-crown-}5)_2^{++}$).

In accordance with the present invention, this affinity has now been successfully used to improve the quality (homogeneity) of alkoxide solutions comprising alkaline earth metal cations. Significant increases in alkaline earth metal solubility have been achieved without interfering in any significant way with the gelation, drying and crystallization steps required for the development of highly crystalline ceramic products.

While the use of crown ethers as a complexing agent is expected to be useful for the solution synthesis of a wide number of polycrystalline ceramic materials, the preferred use is for the preparation of synthetic fluormicas. Accordingly, the following description refers principally to procedures for mica synthesis even though the invention is not intended to be limited thereto.

A number of different methods for synthesizing fluormicas have been developed, including direct mica crystallization from fluoride melts, the thermal crystallization of mica precursor gels, and the growth of mica crystals in thermally crystallizable glasses. Fluormicas may be represented by the generalized structural formula $X_{0.5-1}Y_{2-3}Z_4O_{10}F_2$. The basic structural unit of the crystal is the $Z_2O_5$ hexagonal sheet, formed through the sharing by each $ZO_4$ tetrahedron of three of its four corner oxygens with other $ZO_4$ tetrahedra in a plane.

In the crystal structure of mica, two $Z_2O_5$ sheets, each with their apical oxygens and associated interstitial fluoride ions directed toward each other, are bonded together by the Y cations. These cations coordinate octahedrally with two oxygens and one fluorine from each $Z_2O_5$ sheet. The resultant mica layer has been called a 2-to-1 or T-O-T layer because it consists of two tetrahedral (T) sheets sandwiching one octahedral (O) sheet. The T-O-T layers themselves are bonded to each other by the X cations in so-called interlayer sites, the strength of this bonding determining the interlaminar strength of the mica crystal.

In most mica crystals, the X cations are relatively large in size, while the Y cations are somewhat smaller and the Z cations, typically silicon or aluminum, are the smallest. As previously suggested, the Z cations are in tetrahedral coordination with oxygen, while X cations are in dodecahedral coordination and the Y cations in octahedral coordination. The most common X cation is potassium, but X can be filled by other cations such as $Na^+$, $Rb^+$, $Cs^+$, $Ca^{+2}$, $Sr^{+2}$, and $Ba^{+2}$.

An early description of the crystallization of synthetic fluormicas from glasses is provided by U.S. Pat. No. 3,689,293. The micas described in that patent are typically fluorphlogopite ($KMg_3AlSi_3O_{10}F_2$) or boron fluorphlogopite ($KMg_3BSi_3O_{10}F_2$) micas wherein X is usually K but optionally Na, Rb or Cs, Y is typically Mg or Al, and Z is Si or Al. U.S. Pat. No. 3,732,087 describes the crystallization of tetrasilicic fluormicas ($XY_{2.5}Z_4O_{10}F_2$). In these micas the X, Y and Z cation positions in the crystal are filled as follows: X position -K, Rb, Cs, Sr, Ba or Cd as available; Y position -Mg only; and Z position -Si only. The most common crystal composition of this type is $KMg_{2.5}Si_4O_{10}F_2$.

U.S. Pat. No. 3,756,838 describes the synthesis of yet another class of micas, referred to as trisilicic micas, which are substantially free of alkali metals and $B_2O_3$ and have compositions over the range of solid solutions represented by the crystal formula $X_{0.5-1}Mg_{1.0-2.5}(AlSi_3O_{10})F_2$, wherein X is a heavy alkaline earth metal selected from the group consisting of Sr and Ba. Also known are the disilicic fluormicas, represented by the crystal formula $XMg_3(Al_2Si_2O_{10})F_2$, wherein X is a heavy alkaline earth metal selected from the group consisting of Ba and Sr. These micas, previously synthesized by the thermal treatment of crystallizable glasses, are characterized by high interlaminar strength and good refractoriness.

The use of many of these micas to form protective coatings on inorganic reinforcing fibers for ceramic matrix composites is disclosed in U.S. Pat. No. 4,935,387. As previously noted, that patent teaches the use of mica sols or suspensions for applying mica coatings, but does not utilize a complexation approach for stabilizing the suspensions.

While the use of crown ether complexes can provide more homogenous mica sols for the synthesis of any of the synthetic fluormicas comprising alkaline earth metal cations, such use is particularly advantageous for the preparation of the trisilicic and disilicic micas comprising alkaline earth interlayer cations, due to the difficulty of producing such micas by conventional solution techniques.

Barium disilicic fluormica ($BaMg_3(Al_2Si_2O_{10})F_2$) is known to possess greater refractoriness than many of the more common alkali-containing micas such as the potassium fluorphlogopites. Additionally, the presence of a divalent cation in the interlayer of the sheet silicate is known to increase the interlaminar strength of the mica relative to monovalent interlayer cation micas.

The expected impact of the refractoriness of alkaline earth interlayer micas on coated fiber properties is that the use temperature of the coated system will be increased. Also, in the case of fiber-reinforced ceramic composites, the degree to which reinforcement fibers are mechanically bonded to the matrix in large part determines the strength and toughness of the reinforced material. Therefore, increased interlaminar bond strength of interfacial alkaline earth micas should impact the mechanical properties of the composite as well.

The following detailed examples, which are intended to be illustrative rather than limiting, describe the synthesis and use of synthetic micas of this type.

EXAMPLE 1

A presently preferred method for the synthesis of barium disilicic fluormica utilizes barium metal as a starting material. Under nitrogen gas, 0.80 g Ba metal is first reacted with 20 ml of methanol, with evolution of $H_2$. In a separate flask, 1.99 g $Mg(OC_2H_5)_2$, 2.36 g $Al(OC_3H_7)_3$, and 2.41 g $Si(OC_2H_5)_4$ are dissolved and refluxed in 142 ml 2-methoxyethanol and 8 ml $HNO_3$. The resulting solution is added to the barium solution to produce a cloudy white sol.

The sol thus provided is allowed to cool, and then 3.06 g 18-crown-6 ether is added to complex the barium. This addition, which is sufficient to form a 2:1 sandwich type complex ($Ba(18C6)_2^{++}$) with all of the barium present, results in complete clearing and the development of a pale pink coloration in the sol.

In another flask, 0.45 g $NH_4F\cdot HF$ is dissolved in 45 ml methanol and 5 ml $HNO_3$. This solution is then slowly added to the sol, and is refluxed for about 1 hour. The resulting sol, which remains clear and pale pink, contains sufficient precursor material that 200 ml of sol will yield about 1.5 g of barium disilicic fluormica.

Air hydrolysis of the refluxed sol is then initiated, coincident with solvent evaporation, in order to convert the sol to an oxide gel. The gel which results, having a gummy brown consistency, is then fired to 1100° C. in air to yield the crystalline form of the barium mica product.

The crystalline product is analyzed by powder x-ray diffraction and yields a pattern closely matching the standard pattern (JCPDS 19-117) for barium disilicic mica. A significant amorphous halo indicative of residual glassy phases is also present in the powder pattern.

EXAMPLE 2

A alternative procedure for the synthesis of disilicic barium fluormica utilizes a barium alkoxide starting material in a mixed alkoxide solution. 3.31 g $Mg(OC_2H_5)_2$, 3.94 g $Al(OC_3H_7)_3$, and 1.92 g Ba- (OCH$_3$)$_2$ are weighed out in an inert atmosphere enclosure and removed in a sealed vessel. Under flowing nitrogen, 340 ml of 2-methoxyethanol and 10 ml of nitric acid are then added to the alkoxide mixture, which is thereafter stirred and warmed to about 80° C. Finally, 4.01 g Si(OC$_2$H$_5$)$_4$, and 3.5 g 15-crown-5 ether are added, with stirring being continued for approximately 2 hours. The mixture remains milky white with a fine precipitate.

To this mixture are added 0.72 g NH$_4$F.HF dissolved in 46 ml methanol and 4 ml nitric acid, this addition being completed with no change in the appearance of the alkoxide/15-crown-5 mixture. The precipitate present at this stage is believed to be excess hydrolyzed barium alkoxide.

The precipitate is allowed to settle from the mixture and the supernatant liquid is decanted from the precipitate to provide 400 ml of clear sol. To raise the barium concentration in this sol, either one of two alternative procedures may be followed. In the first procedure, 0.834 g BaF$_2$ is added to 200 ml of the sol. Due to the presence of the crown ether, dissolution of the barium fluoride is rapid and complete, such that a clear homogeneous sol comprising a significant concentration of complexed barium is provided.

In the second alternative procedure, 100 ml of the decanted sol is mixed with 100 ml of a clear solution containing 0.44 g BaF$_2$ and 1.1 g 15-crown-5 ether in 100 ml of 2-methoxyethanol. Again, the addition is accomplished without the precipitation of barium, the sol being clear and homogeneous throughout the mixing process and providing a concentration of mica precursors sufficient to yield 1.25 g of mica from the 200 ml of sol.

The homogeneous sols provided as described are each dried and hydrolyzed in air to form clear gels. Each gel is then calcined at 600° C. in air for at least one hour to remove remaining solvents and other organics, and is thereafter fired in air to a temperature of at least 950° C. for about one hour to achieve a high degree of crystallization.

X-ray diffraction analysis of the resulting crystallized products yields diffraction patterns matching the standard JCPDS 19-117 pattern for barium disilicic fluormica. Impurity peaks corresponding to BaF$_2$, with an additional weak halo indicative of residual glass, are also seen. However, for many applications, BaF$_2$ is not expected to be a harmful impurity, as it is both quite refractory and not readily dissolved in oxide ceramic matrix materials.

EXAMPLE 3

A third synthesis for disilicic barium mica involves the use of 18-crown-6 ether to form a barium complex from barium fluoride. To prepare the complex, 0.66 g of 18-crown-6 ether and 0.44 g of BaF$_2$ are mixed with 93.8 ml of 2-methoxyethanol and 6.2 ml of HNO$_3$. This mixture, providing a 1:1 mole ratio of crown ether to barium, is stirred for one hour to give a clear colorless solution.

To the barium solution produced as described are added 1 26 g Al(OC$_4$H$_9$)$_3$ and 1.06 g Si(OC$_2$H$_5$). This mixture is stirred for 12 hours, again providing a clear colorless solution, and 0.872 g Mg(OC$_2$H$_5$) is next added with stirring for 1 hour until a homogeneous sol is produced. This sol contains sufficient precursor material to yield 1.25 g of barium disilicic mica per 100 ml.

The sol thus produced is gelled and calcined as described in Example 2, except that the clear gel is fired to 1000° C. for one hour to complete the crystallization to mica. The diffraction pattern of the crystalline product again corresponds to the standard pattern for disilicic mica, with some residual glass, although the indicated crystal size is smaller due to the very broad clusters of x-ray diffraction peaks. In this case, there is no evidence of coexisting BaF$_2$.

Chemical analysis of the crystalline product indicates a chemical composition of the molar proportions BaO-1.13, MgO-3.28, Al$_2$O$_3$-1.0, SiO$_2$-2.3, and F-2.0. This composition corresponds to a barium disilicic mica comprising 10% by weight of a glass impurity phase of molar stoichiometr B$_{a0.13}$Mg$_{0.3}$Si$_{0.4}$O$_{1.23}$. The analysis is thus consistent with the observed diffraction pattern.

As previously indicated, an important application of mica synthesis in accordance with the invention is for the application of synthetic mica coatings. These are useful, for example, as interfacial fiber coatings in ceramic matrix composites. Such coatings can provide chemical or physical protection for the fibers, or they can provide a fiber/matrix interface which permits gradual fiber pullout under high stress to impart toughness to the composite system.

A further aspect of the invention, then, is to provide a method for making a composite ceramic article containing protectively-coated fibers. In the conventional method, inorganic reinforcing fibers having a protective coating are combined with a ceramic matrix material by any one of a number of well known procedures to provide a fiber-reinforced ceramic. The present invention constitutes an improvement in fiber coating method, the coating being a ceramic (preferably mica) coating provided by applying to the surfaces of the fibers a sol comprising the coating precursors. The ceramic includes at least one alkaline earth metal and therefore the precursors include one or more dissolved crown ether complexes of an alkaline earth metal. The sol is then gelled and heat-treated to convert it to a ceramic.

As indicated above, for synthetic mica coatings the preferred sol is a silicate sol comprising at least the alkoxides of Si and Al in combination with a dissolved crown ether complex of at least one alkaline earth metal. In this case the gelation and heat treatment of the sol coating produce a synthetic fluormica coating, most preferably a disilicic fluormica coating. The fibers and ceramic matrix materials selected for fabrication of the composite are not critical, although silicon carbide fibers and glass-ceramic matrix materials are presently the most commonly used.

Disilicic fluormicas such as synthesized in the above Examples can offer not only higher interlaminar strength than the fluorphlogopite micas, but can also provide improved coating refractoriness as well as better resistance to the diffusion of coating components into the fibers or matrix. The following examples illustrate the use of the method of the invention to provide fiber-reinforced ceramics comprising fibers with protective mica coatings.

EXAMPLE 4

A number of fiber-reinforced ceramic matrix composites are prepared using barium mica sol precursors to provide protective coatings on the fibers to be employed for matrix reinforcement. The preparation of the precursor sol follows the synthesis of Example 3 above.

To prepare coated fibers, a tow of silicon carbide fiber, commercially available as Nicalon ® NLM-202 fiber tow, is pulled at a rate of 1.5 m/min through a desizing flame and then under a Teflon ® polymer roller immersed in the precursor sol. The coated fiber is then transported through two tube furnaces in succession to dry and gel the precursor coating, the first furnace operating at 200° C. and the second at 300° C., and with the hot zone in each furnace being 75 cm in length.

The coated fiber thus provided is next collected on an alumina spool, and the spool and coated tow are then heated to 600° C. in an air atmosphere for 1 hour to convert the gel coating to a crystalline mica coating.

Where, as in the present case, the mica coating is intended to provide a functional interface (gradual fiber pullout from the matrix) rather than fiber protection, a protective covering layer of another material may be applied over the mica coating. For this purpose, a calcium aluminosilicate sol is used to provide an oxide overcoating, the sol being prepared from a mixture of 0.44 g Ca metal, 5.3 g Al(OC$_4$H$_9$)$_3$ and 4.5 g Si-(OC$_2$H$_5$)$_4$. These constituents are mixed with 10 ml methanol, 220 ml 2-methoxyethanol, and 10 ml HNO$_3$ to yield a clear colorless sol. The protective overcoating is then applied from this sol using the same processing as used to apply the underlying mica coating, except that no final heat treatment of the tow at 600° C. is employed.

The coated silicon carbide fiber tow thus provided is thereafter incorporated into a ceramic matrix utilizing conventional tow impregnation and composite consolidation procedures which are well known in the art. The matrix material is a powder glass, convertible on heat treatment to a dense anorthite (calcium aluminosilicate) glass ceramic matrix, the powder being introduced into the tow by immersion of the tow in a suspension of the powder. The impregnated tow is stacked to provide preforms of flat plate configuration, and the preforms are then subjected to binder burnout and finally hot-pressed to remove voids from the material and to crystallize the ceramic matrix.

Hot-pressing of the fiber-reinforced composite preforms is carried out at temperatures in the range between 1200° C. and 1340° C. As is well known, consolidation at temperatures near the upper end of this range is normally required to develop tough fracture behavior in silicon-carbide-reinforced composites not comprising mica or other supplemental interfacial fiber coatings.

To evaluate the physical properties of the coated fiber composites produced as above described, sample bars approximately 2 mm×4.5 mm×75 mm in size, wherein the coated fibers are in substantially uniaxial parallel alignment, are cut from plates of the consolidated composite material. These bars are then subjected to strength testing in four-point flexure at room temperature and at elevated temperatures of 1000° and 1200° C.

The flexural properties of six samples of material consolidated at various hot-press temperatures in the specified range are reported in Table 1 below. Included in Table 1 for each of the samples tested are a Sample number, a Sample density (D) in g/cc, the peak hot press (HP) temperature used for preform consolidation, in ° C., the temperature at which each flexure test is carried out (Test Temp.), in ° C., and the flexural test performance data generated. The latter data includes yield or so-called microcrack stress and strain levels (Yield Stress and Yield Elongation), as well as the ultimate stress and strain values recorded at the point of sample breakage (Ultimate Stress and Elongation). Also reported for each test is the flexural modulus of the material, in units of Msi.

TABLE 1

Properties of Composites

| Sample No. Density Hot Press | Test Temp. (°C.) | Yield Stress (ksi) | Yield Elong. (%) | Ult. Stress (ksi) | Ult. Elong. (%) | Flex. Modulus (Msi) |
|---|---|---|---|---|---|---|
| #1 | 25 | 39.4 | 0.21 | 49.5 | 0.29 | 18.5 |
| D = 2.60 | 1000 | 38.7 | 0.27 | 43.1 | 0.31 | 14.5 |
| HP = 1205° | 1200 | 4.0 | 0.04 | 59.9 | 0.71 | 11.0 |
| #2 | 25 | 16.1 | 0.12 | 57.0 | 0.58 | 13.8 |
| D = 2.63 | 1000 | 18.8 | 0.16 | 38.4 | 0.41 | 11.4 |
| HP = 1268° | 1200 | 2.2 | 0.02 | 35.3 | 0.75 | 9.5 |
| #3 | 25 | 29.6 | 0.18 | 65.5 | 0.49 | 16.5 |
| D = 2.62 | 1000 | 29.1 | 0.21 | 43.2 | 0.34 | 13.8 |
| HP = 1310° | 1200 | 11.3 | 0.10 | 54.1 | 0.55 | 11.4 |
| #4 | 25 | 30.7 | 0.19 | 65.9 | 0.49 | 16.4 |
| D = 2.64 | 1000 | 13.1 | 0.11 | 43.6 | 0.37 | 12.4 |
| HP = 1343° | 1200 | 6.5 | 0.10 | 69.8 | 1.20 | 6.8 |
| #5 | 25 | 10.7 | 0.07 | 56.4 | 0.42 | 15.2 |
| D = 2.64 | 1000 | 18.5 | 0.15 | 51.9 | 0.52 | 12.1 |
| HP = 1261° | 1200 | 5.8 | 0.06 | 50.3 | 0.81 | 9.4 |
| #6 | 25 | 20.8 | 0.13 | 60.2 | 0.47 | 16.6 |
| D = 2.65 | 1000 | 16.3 | 0.13 | 48.0 | 0.42 | 12.8 |
| HP = 1309° | 1200 | 10.2 | 0.09 | 62.5 | 0.64 | 11.8 |

Analysis of flexural strength test data such as reported in Table 1 above suggests that variations in hot press consolidation temperature produce only minor differences in mechanical properties in these mica-coated fiber composites. This relative insensitivity to consolidation processing is generally seen at all of the test temperatures employed.

As previously noted, it is ordinarily necessary, in the absence of supplemental fiber coatings, to consolidate silicon carbide fiber composites at temperatures of 1340° C. or higher in order to achieve relatively tough fracture behavior (ultimate strain values on the order of 0.4≠0.6%). The mica-coated fibers of the above examples yield good elongation properties even when consolidated at significantly lower consolidation temperatures.

Also significant is the fact that the fracture behavior of the composites illustrated in Table 1 is greatly superior to that of similar composites prepared with uncoated silicon carbide fibers. The latter composites demonstrate severe degradation of mechanical properties in flexural testing at 1000° C. and above, due to oxidative deterioration of the fibers. Thus the alkaline earth interlayer micas provide the added benefit of oxidation protection for these fibers.

Fiber coating processes such as illustrated in Example 4 above can be used to provide thicker mica coatings according to the demands of the particular fiber application involved. The coating procedure shown may be repeated as necessary to increase coating thickness, or a two-stage drying process variation can be used. In that variation, the sol-coated fibers are dried first at 150° C. (both furnaces) and then re-dried at 300° C., prior to recoating with the sol. This practice improves coating uniformity and fiber separation when thick mica coatings are needed.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

I claim:

1. A method for synthesizing an alkaline earth metal-containing ceramic material which comprises the steps of:
    preparing a sol or solution comprising precursors for the ceramic material, which precursors comprise a dissolved crown ether complex of an alkaline earth metal;
    hydroylzing the sol or solution to form a gel;
    drying the gel; and
    heat-treating the dry gel to convert the precursors to the ceramic material.

2. A method in accordance with claim 1 wherein the ceramic material is an oxide glass, glass-ceramic, or ceramic, and wherein the alkaline earth metal is selected from the group consisting of Ca, Ba and Sr.

3. A method in accordance with claim 2 wherein the precursors further comprise metal alkoxides.

4. A method for synthesizing an alkaline earth metal-containing fluormica which comprises the steps of:
    forming a silicate sol comprising mica precursors, said precursors comprising the metal alkoxides of Si and Al in combination with a dissolved crown ether complex of at least one alkaline earth metal;
    hydrolyzing the alkoxides to form a gel comprising a homogeneous dispersion of the alkaline earth metals;
    drying the gel; and
    heat treating the gel to develop synthetic alkaline earth metal-containing fluormica crystals therein.

5. A method in accordance with claim 4 wherein the dissolved crown ether complex is a complex of at least one alkaline earth metal selected from the group consisting of Ca, Ba and Sr.

6. A method in accordance with claim 5 wherein the silicate sol further comprises a magnesium alkoxide, and wherein the dissolved crown ether complex is a complex of Ba and/or Sr.

7. A method in accordance with claim 6 wherein the fluormica crystals comprise Ba and/or Sr as interlayer cations.

8. A method in accordance with claim 4 wherein the synthetic fluormica is synthesized as a fluormica coating.

* * * * *